(12) United States Patent
Jurss

(10) Patent No.: US 9,367,843 B2
(45) Date of Patent: Jun. 14, 2016

(54) TRANSACTION ALERTING IN A MULTI-NETWORK ENVIRONMENT

(75) Inventor: Penny Jurss, Pewaukee, WI (US)

(73) Assignee: Visa International Service Association, San Francisco, CA (US)

(*) Notice: Subject to any disclaimer, the term of this patent is extended or adjusted under 35 U.S.C. 154(b) by 220 days.

(21) Appl. No.: 13/273,986

(22) Filed: Oct. 14, 2011

(65) Prior Publication Data

US 2012/0095918 A1 Apr. 19, 2012

Related U.S. Application Data

(60) Provisional application No. 61/393,286, filed on Oct. 14, 2010, provisional application No. 61/443,220, filed on Feb. 15, 2011.

(51) Int. Cl.
| | |
|---|---|
| *G06Q 20/40* | (2012.01) |
| *G06Q 20/02* | (2012.01) |
| *G06Q 20/32* | (2012.01) |
| *G06Q 20/34* | (2012.01) |
| *G06Q 20/42* | (2012.01) |

(52) U.S. Cl.
CPC .............. *G06Q 20/40* (2013.01); *G06Q 20/027* (2013.01); *G06Q 20/3255* (2013.01); *G06Q 20/34* (2013.01); *G06Q 20/405* (2013.01); *G06Q 20/425* (2013.01)

(58) Field of Classification Search
None
See application file for complete search history.

(56) References Cited

U.S. PATENT DOCUMENTS

| | | | | |
|---|---|---|---|---|
| 5,708,422 A | * | 1/1998 | Blonder | G06Q 20/40 340/5.41 |
| 6,341,724 B2 | | 1/2002 | Campisano | |
| 7,689,508 B2 | | 3/2010 | Davis | |
| 8,145,566 B1 | * | 3/2012 | Ahuja et al. | 705/39 |
| 2002/0161701 A1 | | 10/2002 | Warmack | |
| 2003/0126075 A1 | * | 7/2003 | Mascavage, III | G06Q 20/02 705/39 |
| 2004/0098337 A1 | | 5/2004 | Gudgeon | |
| 2006/0208065 A1 | | 9/2006 | Mendelovich | |
| 2007/0078761 A1 | * | 4/2007 | Kagan et al. | 705/39 |

(Continued)

FOREIGN PATENT DOCUMENTS

EP 1821249 A1 * 8/2007

OTHER PUBLICATIONS

International Search Report and the Written Opinion of the International Searching Authority issued in PCT/US2011/056450 on Jun. 1, 2012, 12 pages.

*Primary Examiner* — Robert R Niquette
(74) *Attorney, Agent, or Firm* — Kilpatrick Townsend & Stockton LLP

(57) ABSTRACT

Techniques are provided for generating a transaction alert for a transaction whether the transaction was processed by a first payment processing network associated with an alerting platform or the transaction was processed by a second payment processing network not associated with an alert platform. An authorization request message associated with a transaction is received by a transaction processing server configured to receive authorization request messages from a first payment network and a second payment network. If the authorization request message was routed through the second payment network, alert initiation data is transmitted to an alert platform associated with the first payment network. The alert platform is configured to apply at least one alert criterion to the alert initiation data to determine if an alert is to be generated, generate the alert, and transmit the alert to a mobile application.

16 Claims, 9 Drawing Sheets

(56) References Cited

U.S. PATENT DOCUMENTS

| | | | | |
|---|---|---|---|---|
| 2007/0250392 A1* | 10/2007 | Paulsen et al. | | 705/19 |
| 2008/0288384 A1* | 11/2008 | Collins | G06Q 20/24 | 705/35 |
| 2009/0144163 A1* | 6/2009 | Dickelman | G06Q 20/10 | 705/17 |
| 2009/0204524 A1* | 8/2009 | McGeorge | | 705/35 |
| 2010/0017332 A1* | 1/2010 | Kight | G06Q 20/02 | 705/64 |
| 2010/0121726 A1* | 5/2010 | Coulter et al. | | 705/21 |
| 2010/0138338 A1* | 6/2010 | Hammad | G06Q 20/10 | 705/39 |
| 2010/0211491 A1* | 8/2010 | Kagan | G06Q 20/02 | 705/34 |
| 2010/0274572 A1* | 10/2010 | Hammad et al. | | 705/1.1 |
| 2010/0274679 A1* | 10/2010 | Hammad | | 705/21 |
| 2010/0274688 A1* | 10/2010 | Hammad | | 705/30 |
| 2010/0274691 A1* | 10/2010 | Hammad et al. | | 705/30 |
| 2010/0280914 A1* | 11/2010 | Carlson | G06Q 20/32 | 705/26.35 |
| 2010/0299249 A1* | 11/2010 | Carlson et al. | | 705/39 |
| 2011/0066513 A1* | 3/2011 | Fournier | G06Q 20/20 | 705/16 |
| 2011/0238564 A1* | 9/2011 | Lim et al. | | 705/38 |
| 2011/0313921 A1* | 12/2011 | Dheer | G06Q 20/10 | 705/42 |
| 2012/0047072 A1* | 2/2012 | Larkin | | 705/44 |

* cited by examiner

TRANSACTION ALERTING IN A MULTI-NETWORK ENVIRONMENT

CROSS-REFERENCES TO RELATED APPLICATIONS

This application claims priority from U.S. Provisional Patent Application No. 61/393,286 entitled "Mobile Banking Support," filed Oct. 14, 2010, and U.S. Provisional Patent Application No. 61/443,220 entitled "Pinned Transaction Alerts," filed Feb. 15, 2011, the contents of which are hereby incorporated in their entirety by reference for all purposes.

BACKGROUND

Financial alerting systems have been used to provide notification to users about the status or use of a payment account. For example, when a transaction is processed by a payment network, the transaction may be routed to an alerting platform that determines which if any alerts to generate based on the transaction data. The user may receive the alert on a mobile device.

Increasingly, merchants have a choice of multiple payment processing networks to use when transmitting transactions to be processed. A user who has chosen to receive alerts about a payment account may not receive the desired alerts when a transaction is routed to a payment processing network other than the network that provides the alerting service.

Moreover, a user may have multiple payment accounts, such as debit, credit, and prepaid accounts. If the user receives alerts regarding only one of the user's multiple accounts, the alerting system will fall short of providing the user with comprehensive information about the use and status of the user's payment accounts.

Embodiments of the invention address these and other problems, individually and collectively.

BRIEF SUMMARY

Embodiments of the present invention are directed to methods and systems associated with generation of transaction alerts in a multi-network environment.

One embodiment of the invention is directed to a method for generating an alert. The method includes receiving an authorization request message that is associated with a first transaction. The authorization request message is received by a transaction processing server configured to receive authorization request messages from a first payment network and a second payment network. It is determined if the authorization request message was routed through the first payment network or the second payment network. If the authorization request message was routed through the second payment network, alert initiation data is transmitted to an alert platform associated with the first payment network. In some embodiments, an authorization request message is reformatted to alert initiation data in a format recognized by an alert platform. The alert platform is configured to apply at least one alert criterion to the alert initiation data to determine if an alert is to be generated. The alert platform generates the alert and transmits the alert to a mobile application.

Another embodiment of the invention can be directed to a server computer comprising a processor and a computer readable medium coupled to the processor. The computer readable medium can comprise code executable by a processor for implementing the above-described method.

Another embodiment of the invention directed to a method for generating an alert includes generating, by a computer, an authorization request message associated with a first transaction. The authorization request message is transmitted via one of a first payment processing network or a second payment processing network to a transaction processing server computer. The transaction processing server computer is configured to determine if the authorization request message was routed through the first payment network or the second payment network. If the authorization request message was routed through the second payment network, alert initiation data is transmitted to an alert platform associated with the first payment network. The alert platform is configured to apply at least one alert criterion to the alert initiation data to determine if an alert is to be generated, generate the alert, and transmit the alert to a mobile application.

Another embodiment of the invention can be directed to a computer comprising a processor and a computer readable medium coupled to the processor. The computer readable medium can comprise code executable by a processor for implementing the above-described method.

These and other embodiments of the invention are described in further detail below.

DETAILED DESCRIPTION

Figure 1:
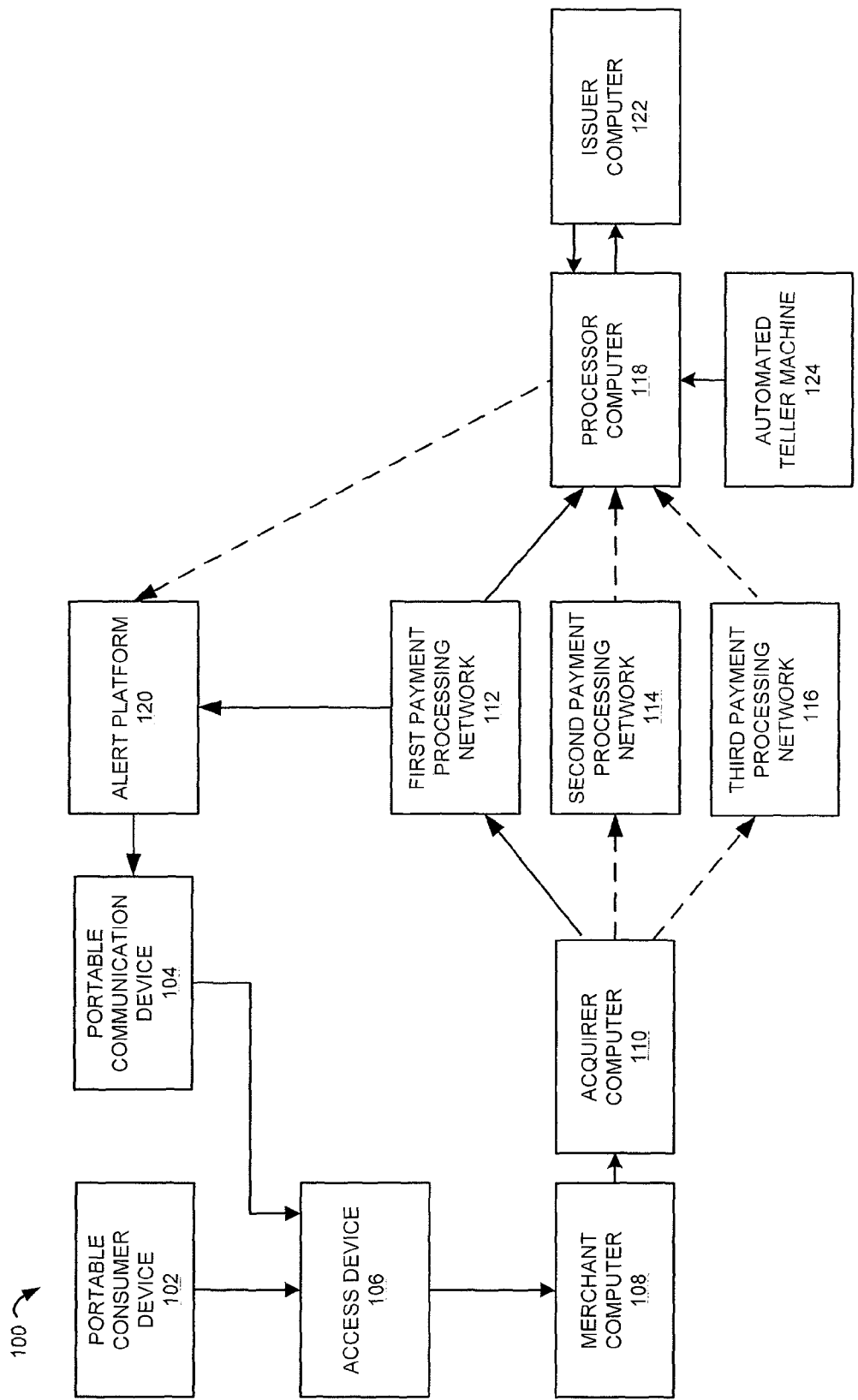
FIG. 1 is a block diagram illustrating a system for conducting an electronic payment transaction and transmitting an alert from one of a plurality of payment processing networks, according to an embodiment of the invention.

Embodiments of the present invention are directed to a system and method for providing alerts to a payment account holder for a transaction routed through either a payment network that is associated with an alert platform or an alternative payment network that is not associated with the alert platform. If an authorization request for the transaction is routed through a payment network that is associated with an alert platform, alert initiation data regarding the transaction is transmitted from the payment network to the alert platform. If the authorization request is routed through an alternative payment network that is not associated with the alert platform, the authorization request is transmitted from the alternative payment network to a transaction processing server computer and alert initiation data regarding the transaction is transmitted from the transaction processing server computer to the alert platform. In this manner, a payment account holder is able to receive alerts resulting from a transaction authorization request even if the authorization request was routed to a payment processing network other than the payment processing network that is associated with the alert platform.

In some embodiments, a user receives the payment account alerts at a mobile device. For example, a mobile application that runs on the mobile device may display alerts to the user. Multiple payment accounts associated with the user may be associated with the mobile device. Alerts may be provided to the mobile device regarding transactions occurring using any of the user's payment accounts. In this manner, the user is able to receive alerts regarding one or more of the user's credit, debit or prepaid payment accounts.

The payment network that is associated with the alert platform may accept authorization requests having a first format that is different from a second format used for authorization requests accepted by the alternative payment network. A first authorization request having a first format may be converted to alert initiation data having a format that is recognized by an alert platform. Similarly, a second authorization request having a second format may be converted to alert initiation data having a format that is recognized by an alert platform. In this manner, the alert platform is able to generate alert messages resulting from transaction data transmitted in either a first authorization request format or a second authorization request format.

The term "computer" as used herein refers to a system comprising a processor and a computer readable medium, such as computer memory or other data storage device, coupled to the processor. The computer readable medium stores code executable by the processor. The term "server computer" as used herein indicates a computer or cluster of computers. For example, the server computer can be a mainframe, a minicomputer cluster, or a group of servers functioning as a unit. In one example, a server computer may be a database server coupled to a Web server. Data transfer and other communications between components such as computers may occur via any suitable wired or wireless network, such as the Internet or private networks.

Transaction Alert System

Referring now to FIG. 1, a functional block diagram illustrating the primary functional elements of an exemplary transaction alert system 100 is shown. Transaction alert system 100 includes one or more server computers, data processing subsystems and networks that can be used to initiate an authorization request message for a transaction and route the authorization request message to an entity capable of approving the transaction. An alerting platform capable of receiving alert initiation data and transmitting an alert to a payment account holder is also shown as a component of transaction alert system 100. It is to be understood that embodiments of the invention may include more than one of the components shown individually in FIG. 1. Additionally, some embodiments of the invention may include fewer than all of the components shown in FIG. 1.

In a typical payment transaction, a payment account holder provides a payment account identifier (e.g., a 16, 18 or 19 digit PAN or primary account number) or payment device identifier (e.g., a phone number) to a merchant, service provider, or other potential recipient of funds. The payment account identifier or payment device identifier may be provided by a card (e.g., a magnetic stripe card or smart card with an embedded chip) to an access device such as a point of sale terminal with a card reader. Alternatively, the payment account identifier may be provided by a contactless element embedded in a mobile device that communicates with a point of sale terminal using a wireless communications protocol. In other embodiments, the payment account identifier is stored in the memory of the mobile device, stored in a database accessible by the mobile device via wireless communications, or any other suitable form.

Typically, an electronic payment transaction is authorized if the payment account holder conducting the transaction is properly authenticated (i.e., their identity and their valid use of a payment account is verified) and has sufficient funds or credit in the payment account to satisfy the transaction. Conversely, if there are insufficient funds or credit in the account, or if the payment device is on a negative list (e.g., it is indicated as possibly having been stolen), then an electronic payment transaction may not be authorized.

In the following description, an "acquirer" is typically a business entity (e.g., a commercial bank) that has a business relationship with a particular merchant. An "issuer" is typically a business entity (e.g., a bank or credit union) which issues a payment device (such as a credit card, debit card, smart card, prepaid device or contactless device) to an account owner and which provides administrative and management functions for the payment account. Some entities may perform both issuer and acquirer functions. A payment account may be any account usable in a transaction, such as a credit, debit or prepaid account.

In a typical transaction, a payment device such as a portable consumer device 102 or portable communication device 104 interfaces with an access device 106 (or, in some embodiments, with merchant computer 108) to initiate a transaction. Typically, the portable consumer device 102 is hand-held and compact so that it can fit into a consumer's wallet or pocket (e.g., pocket sized). Specific examples of portable consumer devices include payment cards such as smartcards, debit devices (e.g., a debit card), credit devices (e.g., a credit card), or stored value devices (e.g., a stored value card or "prepaid" card). Portable communication device 104, also referred to as a "mobile device," may be, for example, a cellular or wireless telephone (e.g., a smartphone), personal digital assistant (PDA), portable computer (e.g., tablet or laptop computer), pager, or other portable device carried by the payment account holder. Portable consumer device 102 and portable communication device 104 are described further below with reference to FIGS. 9 and 10, respectively. Examples of access devices 106 include point of sale (POS) devices, cellular phones, PDAs, personal computers, tablets, handheld specialized readers, set-top boxes, electronic cash registers, automated teller machines (ATMs), virtual cash registers, kiosks, security systems, access systems, and the like. Access devices may use means such as radio frequency (RF) and magnetic stripe readers to interact with portable consumer device 102.

For example, portable consumer device 102 may be a card having a magnetic stripe or chip encoded with account data and access device 106 may be a POS terminal or merchant device reader configured to read account data from the magnetic stripe or chip. The point of sale may be a merchant's physical location or may be a virtual point of sale such as a web-site that is part of an eCommerce transaction. In an eCommerce (electronic commerce) transaction, the account owner may enter payment account data associated with portable consumer device 102 or portable communication device 104 into a device, such as a personal computer, capable of communicating with merchant computer 108. In a further example, communication may occur between a contactless element of portable communication device 104 and an access device 106, such as a merchant device reader or point of sale terminal, by using a wireless communications mechanism, such as near field communications (NFC), RF, infra-red, optical communications, etc.

After the access device 106 receives the payment account identifier or the payment device identifier, the access device or the merchant computer 108 in communication with the access device generates an authorization request message for the transaction. The data included in the authorization request message (also referred to as an "authorization request") may include data obtained from portable consumer device 104 or portable communication device 106, as well as other data related to the transaction, the payment account holder, the merchant, and processing information, such as one or more of a payment account number, the payment device expiration date, a currency code, the sale amount, a merchant transaction stamp, the acceptor city, the acceptor state/country, a routing transit number, a terminal identification, a network identification, etc. An authorization request message may be protected using a secure encryption method (e.g., 128-bit SSL or equivalent) in order to prevent data from being compromised. In one embodiment, the authorization request message is a standardized interchange message such as an International Organization for Standardisation (ISO) 8583 message. An ISO 8583 message includes a message type indicator, one or more bitmaps indicating which data elements are present in the message, and data elements of the message. As part of generating the authorization request message, merchant computer 108 may communicate with a database which stores data such as data regarding the account owner, the payment device, or the account owner's transaction history with the merchant. The merchant computer 108 (or access device 106) transmits the authorization request message to the acquirer computer 110. Acquirer computer 110 then transmits the authorization request to one of a plurality of available payment processing networks 112-116.

It will be appreciated that more payment processing networks than the exemplary first, second and third payment processing networks may be available to receive the authorization request. The merchant may choose one payment processing network option over another based on the relative costs of processing a transaction via the various network options, features provided by the networks, etc.

A payment processing network, also referred to as a "payment network," is a system that may comprise one or more servers, data processing subsystems, networks, and operations used to support and deliver authorization services, exception file services, and clearing and settlement services. A payment processing network may be able to process one or more of credit card transactions, debit card transactions or any other type of commercial transaction. An exemplary first payment processing network may include VisaNet™. The second and third payment processing networks can be similar to the first payment processing network, albeit separate and distinct entities. The payment processing network used to transmit the authorization request message routes the authorization request message to processor computer 118, also referred to as a "transaction processing server computer." Routing may be based on the information contained within the authorization request message, such as a card number, routing options selected by the acquirer, routing options selected by the issuer, etc.

In some embodiments, a first payment processing network 112 (e.g., VisaNet™) is associated with an alert platform 120. When the authorization request message is routed via the first payment processing network 112, the first payment processing network transmits part or all of the authorization request message as alert initiation data to alert platform 120. Alert initiation data is data regarding a transaction received by the alert platform for use in determining whether an alert message is to be generated. Alert initiation data may include, for example, a transaction amount and a payment account identifier or a payment device identifier.

Typically, the first payment processing network 112 parses the authorization request message to obtain data that is relevant to the alert initiation engine, such as a transaction amount and one or more identification sequences. An identification sequence is a subset of an authorization request message containing a payment account number, issuer identification, or other identifying information. The first payment processing network 112 may reformat the authorization request message to a format that is recognized by the alert platform prior to transmitting the alert initiation data to alert platform 120. For example, the alert platform may be configured to receive data via a web services interface and the alert initiation data may be transmitted to the alert platform in extensible markup language (XML) format.

Alternatively, the authorization request message may be routed to a payment processing network that is not associated with alert platform 120, such as second payment processing network 114 or third payment processing network 116. This transmission path is indicated by the dotted line arrows shown in FIGS. 1 and 4. When the authorization request message is not transmitted via first payment processing network 112, the alert platform will not receive alert initiation data from the first payment processing network. To determine whether or not the authorization request message was received from a first payment processing network 112 associated with an alert platform 120, the processor computer 118 parses the authorization request message to obtain routing information. For example, the authorization request message may comprise one or more of an account identifier, routing transit number, terminal identifier, and network identifier usable to determine the payment processing network through which the transaction was routed. In some embodiments, the processor computer determines the payment processing network used to route the transaction by querying a database for routing information associated with identifying information contained in the authorization request message. When processor computer 118 determines that the authorization request message was received from the second or third payment processing network, the processor computer may transmit part or all of the authorization request message as an "alert initiation message" to alert platform 120. Processor computer 118 may reformat the authorization request message to a format that is recognized by the alert platform 120 prior to transmitting the alert initiation data to alert platform 120.

Processor computer 118 manages and provides services related to payment accounts, such as transaction processing, risk management, and any other similar services associated with payment accounts. In one embodiment, the processor computer is a debit processing system (DPS). The processor computer 118 transmits the authorization request message to issuer computer 122. The issuer computer 122 generates an authorization response message indicating whether the transaction was authorized. The authorization response message is routed back to the merchant computer 108. The authorization response may be displayed by the access device 106 (e.g., a POS terminal), printed on a receipt, or otherwise conveyed to the payment account holder.

At the end of the day, a normal clearing and settlement process can be conducted by each of the payment processing networks. A clearing process is a process of exchanging financial details between an acquirer and an issuer to facilitate posting to the payment account holder's account and reconciliation of the consumer's settlement position. Clearing and settlement can occur simultaneously.

The transaction alert system may also generate alerts for transactions at automated teller machines (ATM) 124 communicatively coupled to processor computer 118. The ATM 124 transmits an authorization request message to processor computer 118. The processor computer 118 may transmit an alert initiation message to alert platform 120 based on an authorization request message received from ATM 124.

In some embodiments, processor computer 118 may generate an alert initiation message for transmission to alert platform 120 based on transaction information received from issuer computer 122. The alert initiation message may be based on an interchange message received from issuer computer 122, such as an ISO 8583 message uniquely designed for this transmission path.

Alert platform 120 can be embodied by one or more server computers. An alert platform application residing on the one or more server computers typically applies one or more alert criteria to the received alert initiation data to determine whether to generate an alert message. An alert message is a message transmitted to a payment account holder containing information regarding the status of the account or a transaction made using the account. When an alert message is generated, the alert platform 120 transmits the alert message to a payment account holder, for example, via a mobile application executed on portable communication device 104 of the payment account holder. In some embodiments, the alert platform is configured to communicate with a database to retrieve alert criteria associated with one or more payment accounts of a payment account holder.

The alert platform 120 may include an interface that allows an entity, such as the alert recipient or a financial institution, to define alert criteria. The alert platform may be a separate system from the first payment processing network, as shown in FIG. 1. However, it should be appreciated that other embodiments can include an alert service that is a component of the first payment processing network.

The alert platform 120 may comprise an IP gateway that is communicatively coupled to a web services system. Web services may include an enrollment server computer that hosts a website which provides an electronic enrollment form to users to enroll in the alert messaging service. An enrollment database of a payment processing network may be synchronized with a cardholder enrollment database in the IP Gateway, which can allow for a thin database within the payment processing network that includes all users enrolled in alert services. The thin database can allow for fast determination of whether an alert initiation request should be transmitted to the IP gateway. The transaction alert system is described in further detail in U.S. patent application Ser. No. 12/720,627 filed Mar. 9, 2010, the contents of which is hereby incorporated in its entirety by reference for all purposes.

An alert criterion can refer to a rule applied to transaction data in alert initiation data or in an authorization request message that is used to determine whether an alert is to be delivered to the payment account holder. For example, an alert criterion may be a transaction threshold criterion that generates an alert for any transaction made for a transaction amount exceeding a predetermined threshold amount. Other examples of alert criteria include a transaction for a fuel purchase, occurrence of a card not present transaction, an automatic teller machine (ATM) withdrawal, a transaction for a purchase in a country other than the country of residence of the payment account holder, a declined transaction, a transaction in which a referral response is received (i.e., authorization from a bank is required), or a transaction that results in a payment account balance falling below a threshold level. In some embodiments, alerts are configured to be triggered periodically. Alert criteria for periodic alerting may include, for example, a weekly balance update.

Alerts may be transmitted from the alert platform 120 to the portable communication device 104 in one or more of short message service (SMS), e-mail, instant message, or other web delivery service formats. A mobile application of portable communication device 104 may receive from the alert platform an alert resulting from an authorization request message. A mobile application is a series of instructions executed by a processor of a mobile device such as portable communication device 104. In some embodiments, the mobile application is an alerting application that may display a series of alerts associated with one or more payment accounts on a display of a mobile device. The alerting application may be a component of a mobile banking application that assists the mobile device user with banking-related transactions and other banking services. In other embodiments, the alerts are viewed by the user of the mobile device as SMS, instant messages, e-mail messages or other message formats.

Alert Generation

Figure 2:
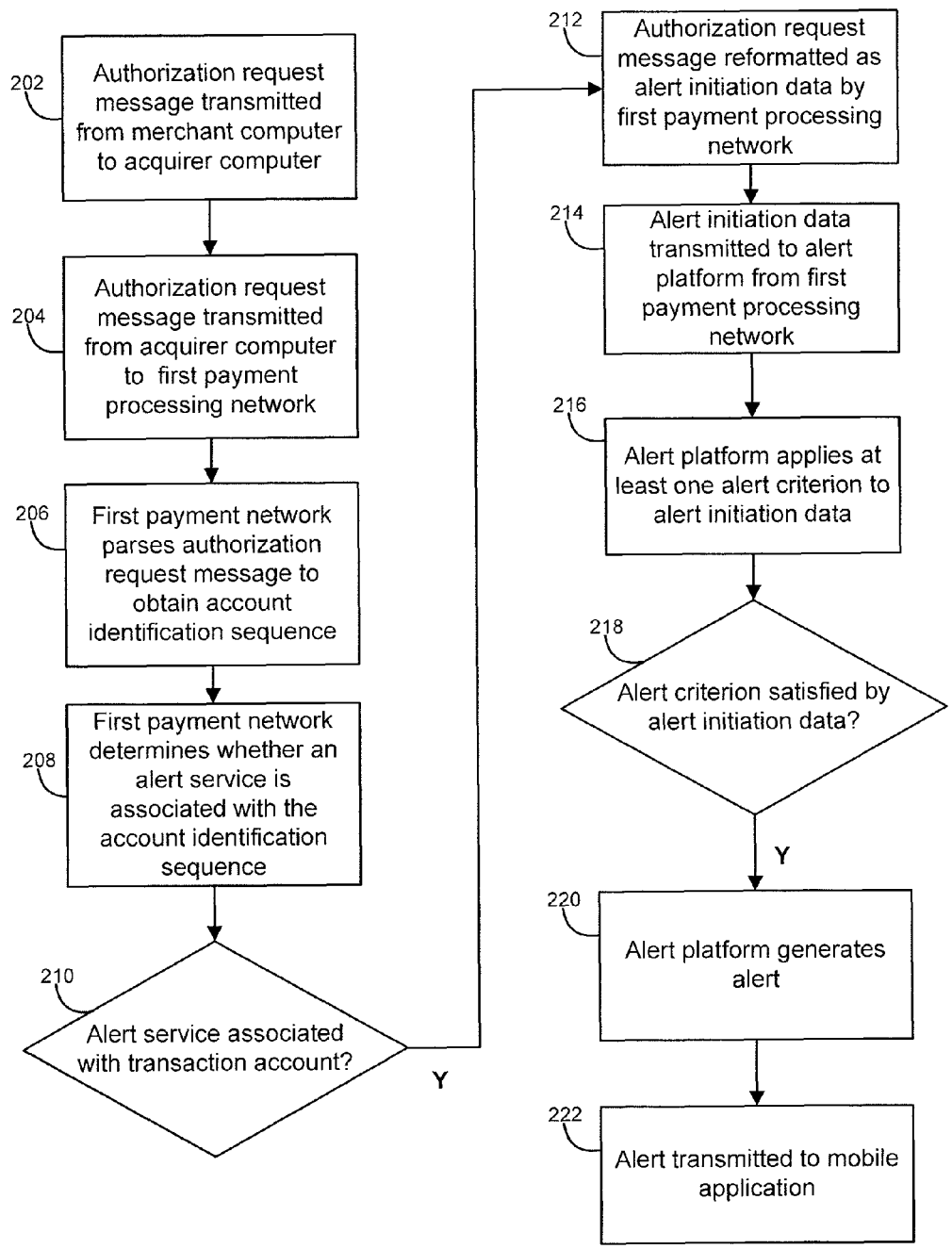
FIG. 2 is a flow diagram showing operations involved in generating an alert based on an authorization request message routed to a first payment processing network that is associated with an alerting platform, according to an embodiment of the invention.
Figure 3:
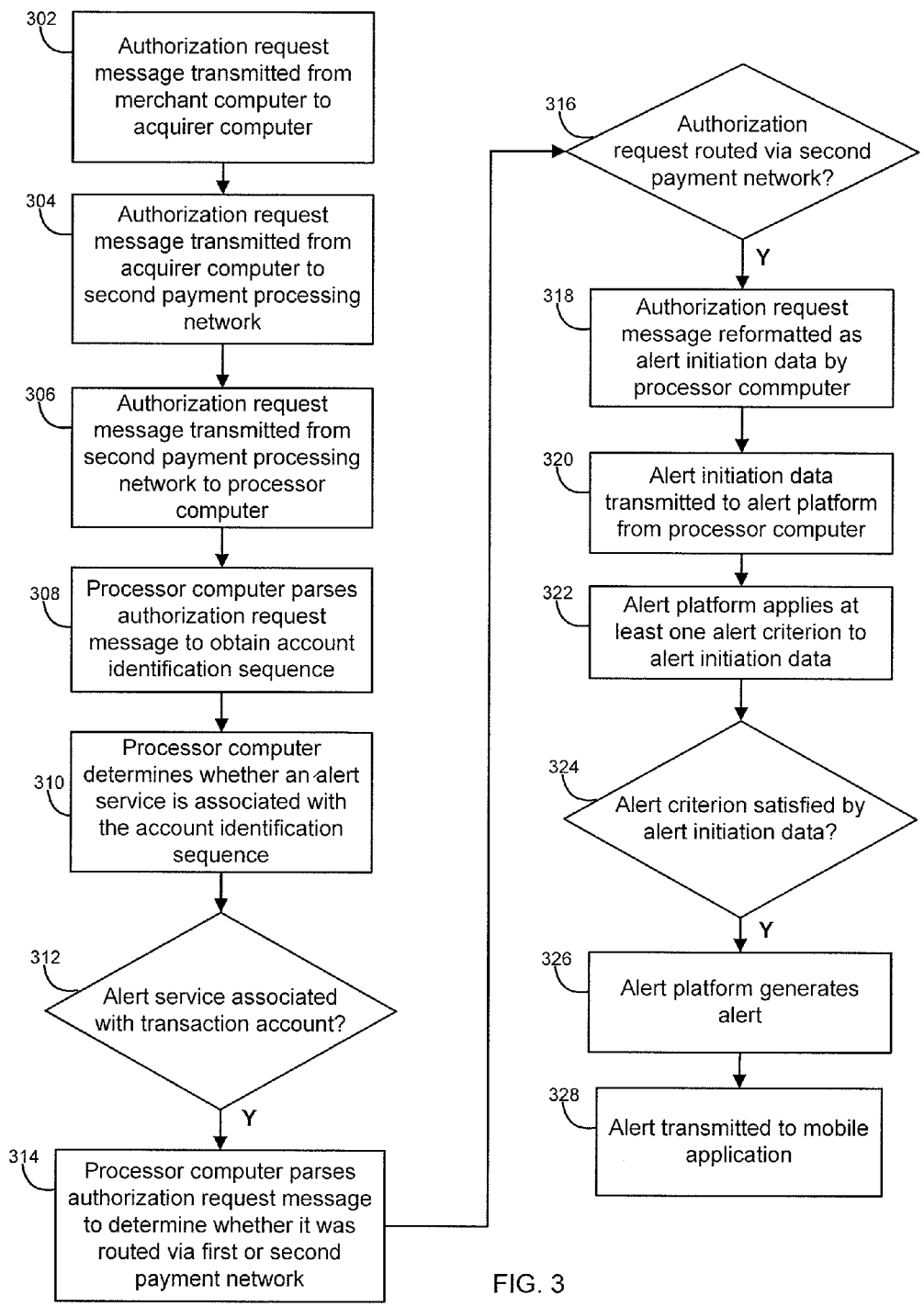
FIG. 3 is a flow diagram showing operations involved in generating an alert based on an authorization request message routed to a second payment processing network that is not associated with an alerting platform, according to an embodiment of the invention.

FIGS. 2 and 3 are flow diagrams showing operations involved in generating an alert message based on a transaction. In FIG. 2, an authorization request message is routed to processor computer 118 via first payment network 112. Accordingly, alert initiation data is transmitted from the first payment network to alert platform 120. In FIG. 3, an authorization request is routed to processor computer 118 via second payment network 114. In this case, alert initiation data is transmitted from the processor computer to the alert platform, a path indicated by the dotted line arrows of FIGS. 1 and 4.

Referring now to FIG. 2, a flow diagram shows operations involved in generating an alert based on an authorization request message routed to a first payment processing network that is associated with an alerting platform. At operation 202, an authorization request message for a transaction initiated with a merchant is transmitted from merchant computer 108 to acquirer computer 110. At operation 204, acquirer computer 110 routes the authorization request message to first payment processing network 112. At operation 206, first payment processing network 112 (or a server computer therein) parses the authorization request message and analyzes the parsed authorization request message to obtain an account identification sequence such as a payment account identifier, a payment device identifier, an issuer identification, or other identifying information. At operation 208, the first payment network 112 determines whether an alert service is associated with the account identification sequence. For example, the first payment network 112 may communicate with a database that stores associations between account identification sequences and alert service participation indicators to determine whether the account identification sequence of the authorization request message is associated with an alert service participation indicator. As indicated at decision diamond

210, if an alert service is associated with the account identification sequence for the account used in the transaction, alert initiation data is generated.

In some embodiments, the authorization request message is reformatted by the first payment processing network 112 such that alert initiation data presented to the alert platform is in a format that can be accepted by the alerting platform, as indicated at operation 212. At operation 214, The alert initiation data is transmitted from the first payment processing network to alert platform 120. At operation 216, the alert platform applies at least one alert criterion to the received alert initiation data. At decision diamond 218, it is determined whether the at least one alert criterion is determined to be applicable to the alert initiation data. If the alert criterion is determined to be applicable to the alert initiation data, alert platform 120 generates an alert, as indicated at operation 220. At operation 222, the alert message is transmitted from alert platform 120 to portable communication device 104.

Referring now to FIG. 3, a flow diagram shows operations involved in generating an alert based on an authorization request message routed to a second payment processing network that is not associated with an alerting platform. The operations could also be applied to third payment processing network 116 or another payment processing network not associated with an alerting platform. Operations 308-328 could be applied to an authorization request message received by processor computer 118 from ATM 124 Similarly, operations 308-328 could be applied based on an interchange message received by processor computer 118 from issuer computer 122.

At operation 302, an authorization request message for a transaction initiated with a merchant is transmitted from merchant computer 108 to acquirer computer 110. At operation 304, acquirer computer 110 routes the authorization request message to second payment processing network 114. At operation 306, the authorization request message is routed from second payment processing network 114 to processor computer 118. Processor computer 118 parses the authorization request message and analyzes the parsed message to obtain an account identification sequence, as indicated at operation 308. At operation 310, the processor computer determines whether an alert service is associated with the account identification sequence. For example, the processor computer may communicate with a database that stores associations between account identification sequences and alert service participation indicators to determine whether the account identification sequence of the authorization request message is associated with an alert service participation indicator. As indicated at decision diamond 312, if an alert service is associated with the account identification sequence for the account used in the transaction, alert initiation data may be generated.

The processor computer 118 may further determine whether the authorization request message was received from a payment processing network associated with alert platform 120, such as first payment processing network 112, or if it was received from a payment processing network not associated with the alert platform, such as second payment processing network 114. If the authorization request message was routed to processor computer 118 via first payment processing network 112, an alert initiation request has already been transmitted from the first payment processing network to the alert platform (as described with reference to FIG. 2) and thus an alert initiation request sent from processor computer 118 to alert platform 120 would be a duplicate request. To avoid duplicate alert initiation requests, the processor computer may parse the authorization request message and analyze the parsed message to obtain a payment processing network identification sequence, as indicated at operation 314. If the payment processing network identified is the first payment processing network, an alert initiation request is not generated by the processor computer. As indicated at decision diamond 316, if the authorization request message is routed via the second payment network, alert initiation data is generated.

In some embodiments, the authorization request message is reformatted by the first payment processing network such that alert initiation data presented to the alert platform is in a format that can be accepted by the alerting platform, as indicated at operation 318. At operation 320, the alert initiation data is transmitted from processor computer 118 to alert platform 120. At operation 322, the alert platform applies at least one alert criterion to the received alert initiation data. At decision diamond 324, it is determined whether the at least one alert criterion is determined to be applicable to the alert initiation data. If the alert criterion is determined to be applicable to the alert initiation data, alert platform 120 generates an alert, as indicated at operation 326. At operation 328, the alert is transmitted from alert platform 120 to portable communication device 104.

Multiple Account Alerting

Figure 4:
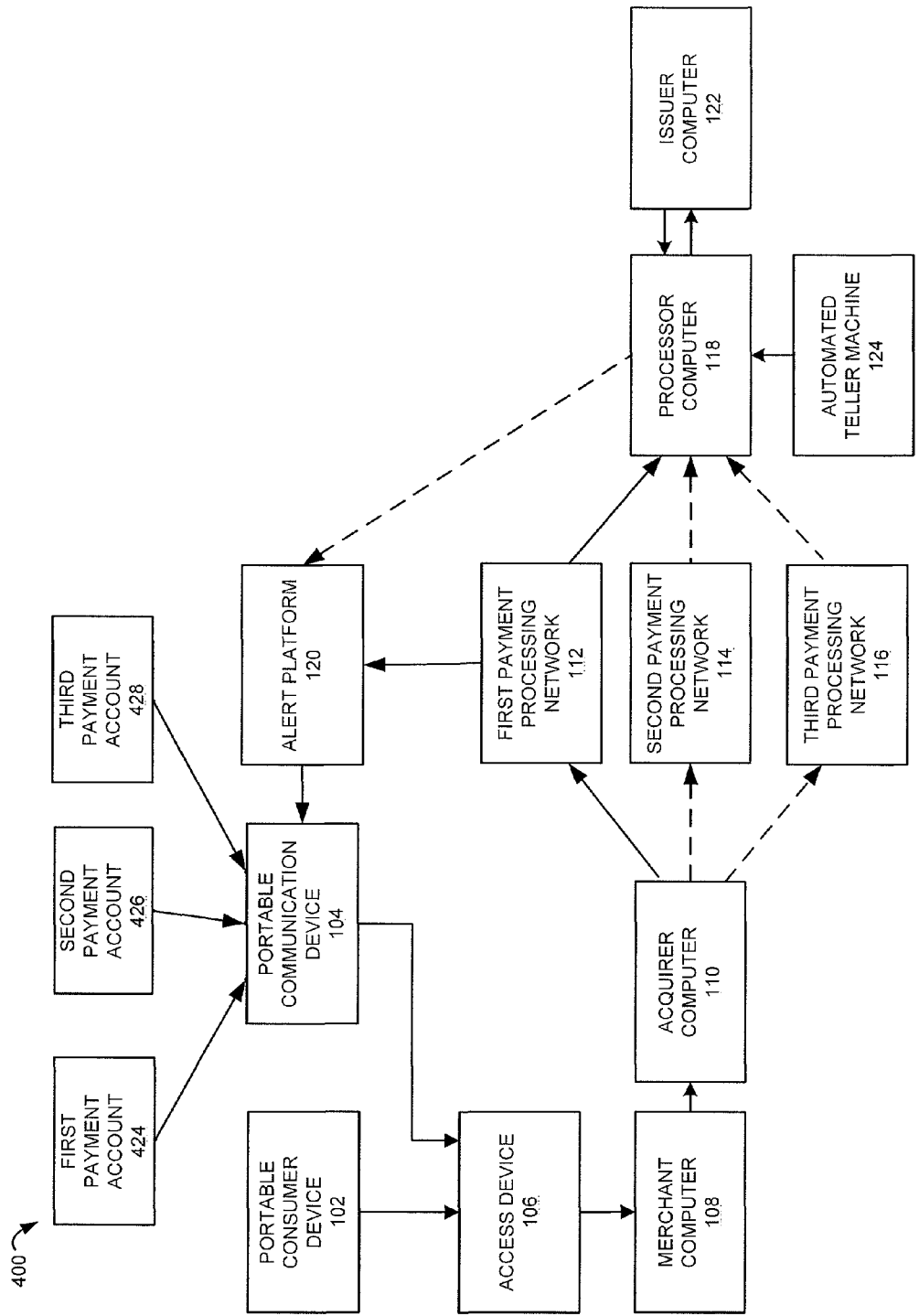
FIG. 4 is a block diagram illustrating a system for conducting an electronic payment transaction with alerting for multiple payment accounts, according to an embodiment of the invention.
Figure 5:
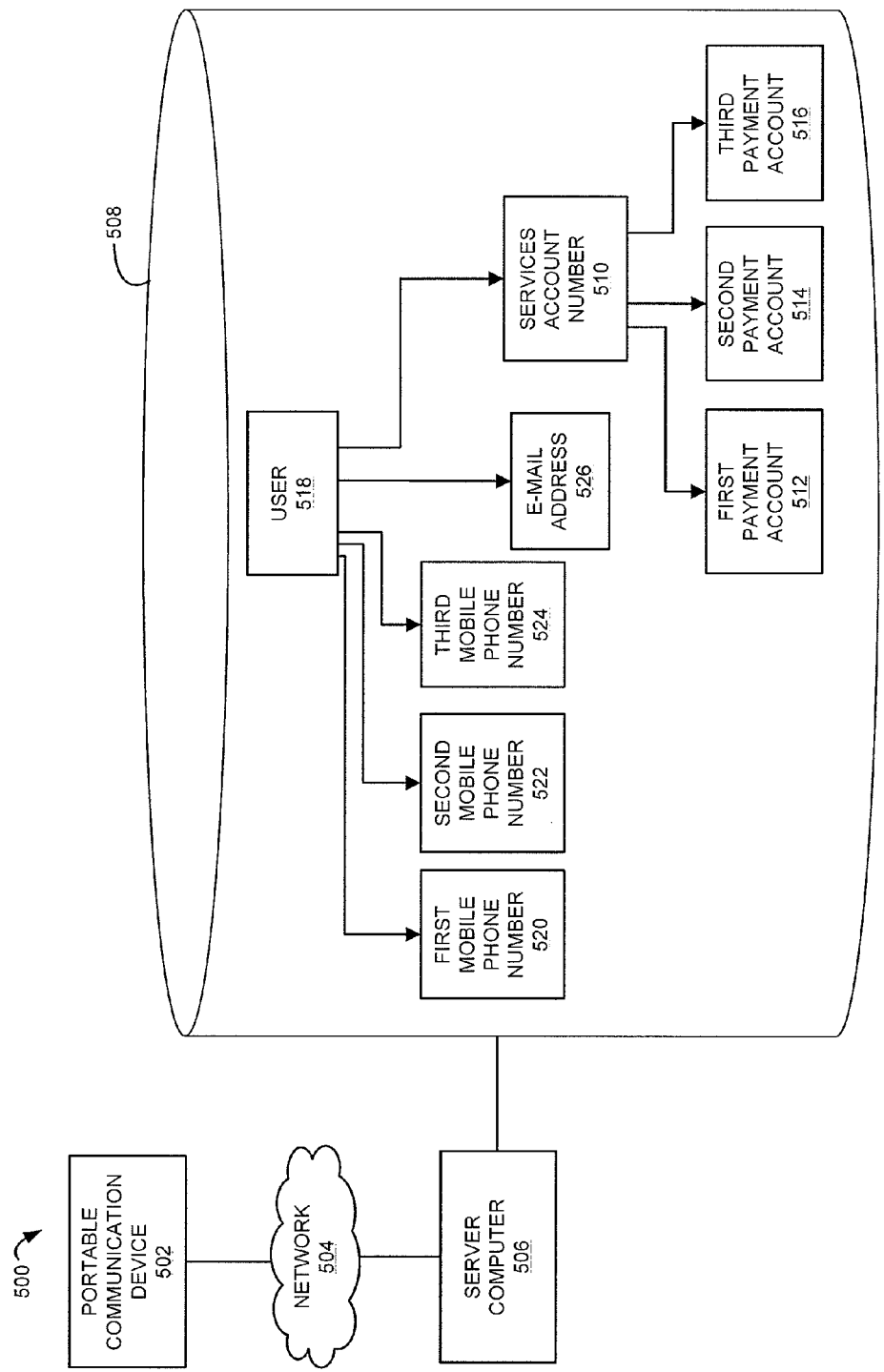
FIG. 5 is a block diagram illustrating a system for linking multiple payment accounts to a services account, according to an embodiment of the invention.

In some embodiments, alerting may be received regarding multiple payment accounts associated with a particular user. FIGS. 4-5 illustrate a flow diagram and system diagram, respectively, for a transaction processing system capable of providing alerting regarding multiple accounts.

Referring now to FIG. 4, a functional block diagram illustrating the primary functional elements of an exemplary transaction alert system with alerting for multiple payment accounts 400 is shown. Similar to the transaction alert system 100 of FIG. 1, transaction alert system 400 comprises portable consumer device 102, portable communication device 104, access device 106, merchant computer 108, acquirer computer 110, first payment processing network 112, second payment processing network 114, third payment processing network 116, processor computer 118, alert platform 120, issuer computer 122 and ATM 124. These similar elements function as described with reference to FIG. 1. Transaction alert system 400 further comprises first payment account 424, second payment account 426 and third payment account 428. The three payment accounts 424-428 are associated with a common services account. For example, a consumer may have a first payment account 424 that is a credit account, a second payment account 426 that is a debit account and a third account 428 that corresponds to a prepaid card. Transactions may be conducted with any of accounts 424-428 or with a combination of these accounts. In some embodiments, the support for multiple payment accounts is integrated into a mobile service account that associates the multiple payment accounts with a particular mobile device. The mobile service account may be associated with a mobile banking application in which the holder of the accounts may enroll, as described further with reference to FIG. 5.

The association of multiple accounts with a single services account allows the services account holder to receive alerts regarding the multiple accounts at a single device such as portable communication device 104. When alert platform 120 receives alert initiation data, the alert platform may determine which of accounts 424, 426 and 428 was used for the transaction resulting in the alert initiation. When the alert platform transmits an alert, the alert may include information regarding one or more accounts to which the alert is applicable.

FIG. 5 shows a block diagram illustrating a system 500 for linking multiple payment accounts to a services account. Portable communication device 502 is communicatively coupled to server computer 506 via communications network 504. Server computer 506 may communicatively coupled to one or more additional elements of transaction alert system 100, such as first payment processing network 112. In some embodiments, sever computer 506 is a component of first payment processing network 112. Server computer 506 comprises database 508. An application running on the portable communication device or other application configured to communicate with server 506 is used to associate a services account number 510 with one or more payment accounts such as first payment account 512, second payment account 514 and third payment account 516. It will be recognized that additional payment accounts may be associated with services account number 510. The services account number may be associated with a user 518. The information used to access portable communication device 502, such as the phone number associated with the communication device, may be associated with user 518. In some embodiments, multiple mobile phone numbers 520, 522 and 524 are associated with user 518. E-mail address 526 may also be associated with user 518. Associations between the services account number, payment accounts, a user, mobile phone numbers and an e-mail address are stored in one or more tables of database 508. In this manner, services account number 510 may be used to complete transactions with one or more of payment accounts 512-516. Further, information regarding payment accounts 512-516 may be sent to user 518 at any or all of the phone numbers and e-mail addresses associated with the user.

In some embodiments, a mobile banking application executed by a processor of portable communication device 502 provides one or more of the following services: initiation of a services account; association between the services account number and one or more payment account numbers; association between a user, a services account number, one or more mobile phone numbers, and an e-mail address; payment to a merchant; and receipt and display of alerts regarding the multiple payment accounts.

In an illustrative example, an authorization request message is transmitted from acquirer computer 110 to first payment processing network 112 regarding a transaction made with first payment account 512. First payment processing network 112 converts the authorization request message to alert initiation data and transmits alert initiation data to alert platform 120. An alert criterion triggers an alert which is transmitted to portable communication device 502. The portable communication device displays the alert regarding the transaction made with the first payment account.

In an additional illustrative example, an authorization request message is transmitted from acquirer computer 110 to second payment processing network 114 regarding a transaction made with third payment account 516. The second payment processing network transmits the authorization request message to processor computer 118. The processor computer converts the authorization request message to alert initiation data and transmits alert initiation data to alert platform 120. An alert criterion triggers an alert which is transmitted to portable communication device 502. The portable communication device displays the alert regarding the transaction made with the third payment account.

Alert Access on Mobile Devices

Figure 6:
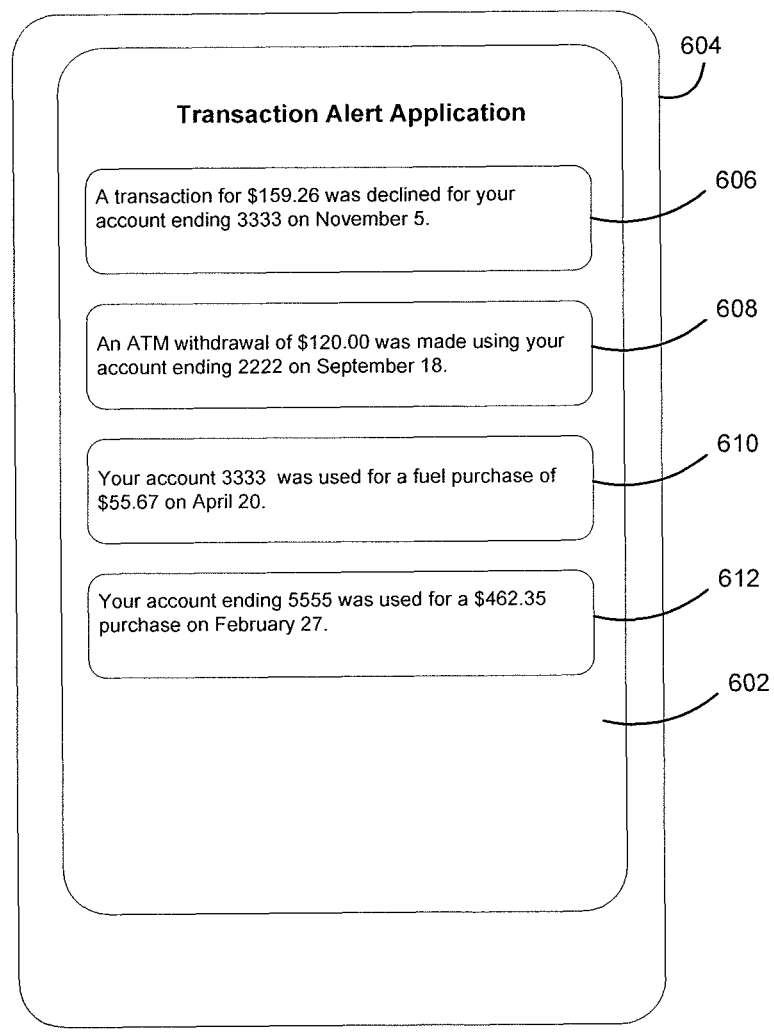
FIG. 6 is an illustrative user interface for presenting alerts on the display of a portable communication device, according to an embodiment of the invention.

Alerts received by portable communication device 104 are typically presented to the user on a display of the device via a mobile application executed by a processor of the portable communication device. One or more transaction alerts may be displayed, for example, by an alerting-specific mobile application or by an alerting feature of a mobile banking application. For example, an alerting application may display a series of received alerts, as shown in FIG. 6. In another embodiment, alerts are received at the portable communication device via SMS or e-mail, as indicated in FIGS. 7A-7B.

Referring now to FIG. 6, an illustrative display 602 of a portable communication device 604 is shown presenting alerts 606-612. The displayed alert may include information such as the date of the transaction, the amount of the transaction, the reason the alert was triggered and information about the account used for the transaction. In some embodiments, the mobile application periodically communicates with the alert platform to determine whether new alerts have been generated for one or more accounts associated with the portable communication device. A mobile banking application may have a push notification feature, allowing the application to receive alerts from the alerting platform through a constantly or periodically open IP connection. In other embodiments, the user initiates a request to update the application with any received alerts. Further, an alert may be received via SMS or e-mail message and the mobile application may be updated with the information of the message. In the illustrative example, alerts 606, 608 and 612 received at the portable communication device 604 correspond to different payment accounts, such as payment accounts 424, 426 and 428 shown in FIG. 4.

Figure 7A:
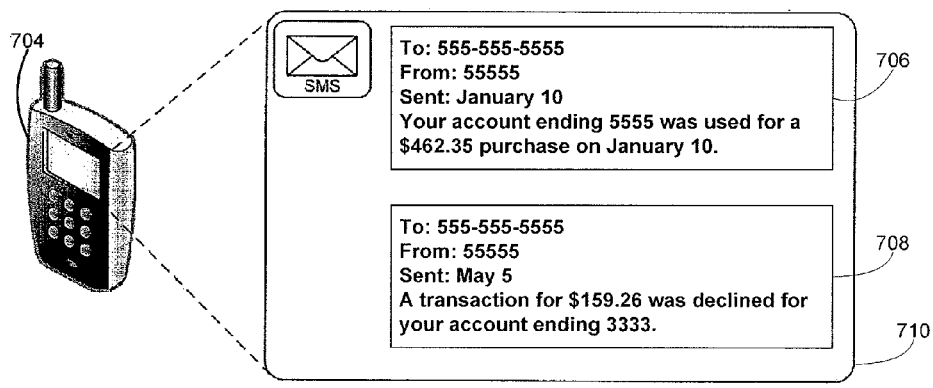
FIG. 7A is an illustrative presentation of alerts with an SMS application of a portable communication device, according to an embodiment of the invention.

FIG. 7A indicates alerts received at the portable communication device via SMS. In some embodiments, the alert platform transmits alerts to portable communication device 704 in SMS format. The SMS may be viewed using a mobile application such as an SMS application of the portable communication device. Exemplary SMS messages 706 and 708 are shown as presented in an illustrative SMS application 710 executed by a processor of portable communication device 704.

Figure 7B:
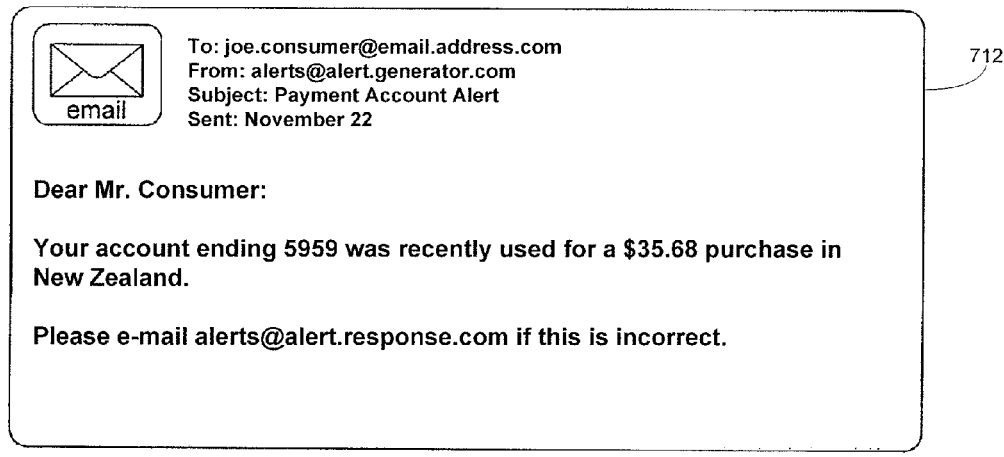
FIG. 7B is an illustrative presentation of an alert with an e-mail application of a portable communication device, according to an embodiment of the invention.

FIG. 7B indicates an alert received at the portable communication device via e-mail. In some embodiments, the alert platform transmits alerts to the portable communication device in e-mail format. The e-mail may be viewed using a mobile application such as an e-mail application or web browser application of the portable communication device. Exemplary e-mail message 712 is shown as presented in e-mail format on the portable communication device.

System Devices

The various participants and elements described herein with reference to FIGS. 1 and 4 may operate one or more computer apparatuses to facilitate the functions described herein. Any of the elements in FIGS. 1 and 4, including any servers or databases, may use any suitable number of subsystems to facilitate the functions described herein.

Figure 8:
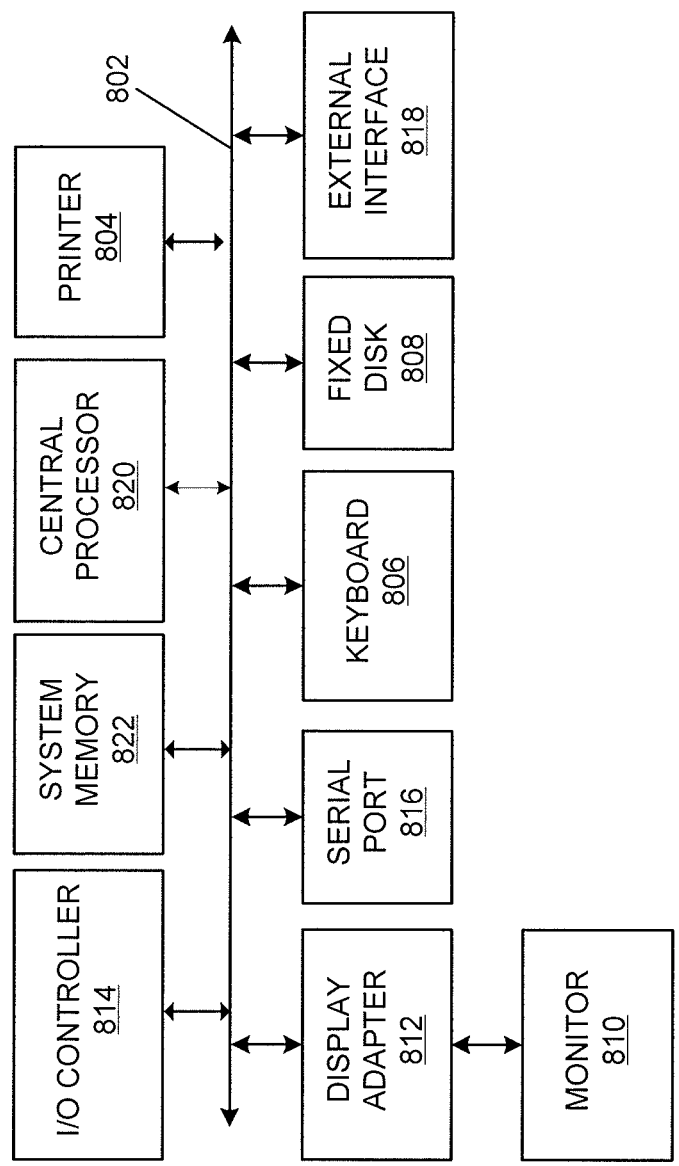
FIG. 8 is a block diagram of a computer apparatus that may be used to implement the payment processing and alerting techniques disclosed herein, according to an embodiment of the invention.

Examples of such subsystems or components are shown in FIG. 8. The subsystems shown in FIG. 8 are interconnected via a system bus 802. Additional subsystems such as a printer 804, keyboard 806, fixed disk 808 (or other memory comprising computer readable media), monitor 810, which is coupled to display adapter 812, and others are shown. Peripherals and input/output (I/O) devices, which couple to I/O controller 814 (which can be a processor or other suitable controller), can be connected to the computer system by any number of means known in the art, such as serial port 816. For example, serial port 816 or external interface 818 can be used to connect the computer apparatus to a wide area network such as the Internet, a mouse input device, or a scanner. The interconnection via system bus allows the central processor 820 to communicate with each subsystem and to control the execution of instructions from system memory 822 or the fixed disk 808, as well as the exchange of information between subsystems. The system memory 822 and/or the fixed disk 808 may embody a computer readable medium.

Figure 9:
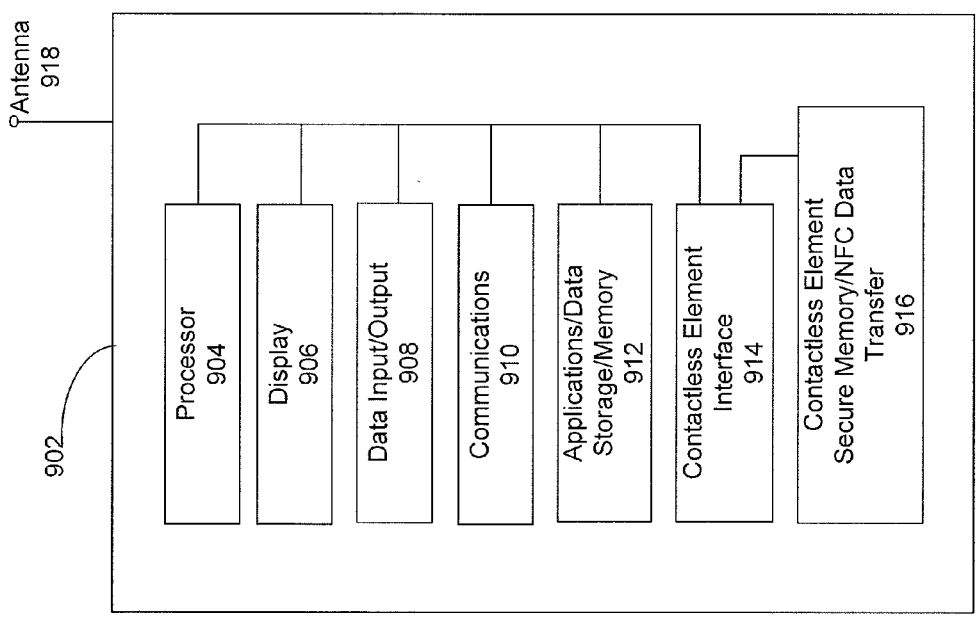
FIG. 9 is a block diagram of a portable communication device that may be used to implement the mobile banking operations disclosed herein, according to an embodiment of the invention.

FIG. 9 is a functional block diagram illustrating a portable communication device that may be used to perform mobile banking operations, such as initiating transactions and receiving and displaying transaction alerts, in accordance with some embodiments of the present invention. Portable consumer device 902 may include circuitry that is used to enable certain device functions, such as telephony. The functional elements responsible for enabling those functions may include a processor 904 that is programmed to execute instructions that implement the functions and operations of the device. Processor 904 may access data storage 912 (or another suitable memory region or element) to retrieve instructions or data used in executing the instructions. Data input/output elements 908 may be used to enable a user to input data (via a microphone or keyboard, for example) or receive output data (via a speaker, for example). Display 906 may also be used to output data to a user. Communications element 910 may be used to enable data transfer between device 902 and a wireless network (via antenna 918, for example) to assist in enabling telephony and data transfer functions. Device 902 may also include contactless element interface 914 to enable data transfer between contactless element 916 and other elements of the device, where contactless element 916 may include a secure memory and a near field communications data transfer element (or another form of short range communications technology). As noted, a mobile phone or similar device is an example of a portable communication device that may be used to display alerts as described with reference to embodiments of the present invention. However, other forms or types of devices may be used without departing from the underlying concepts of the invention. Further, devices that are used to display alerts may not require the capability to communicate using a cellular network in order to be suitable for use with embodiments of the present invention.

Figure 10:
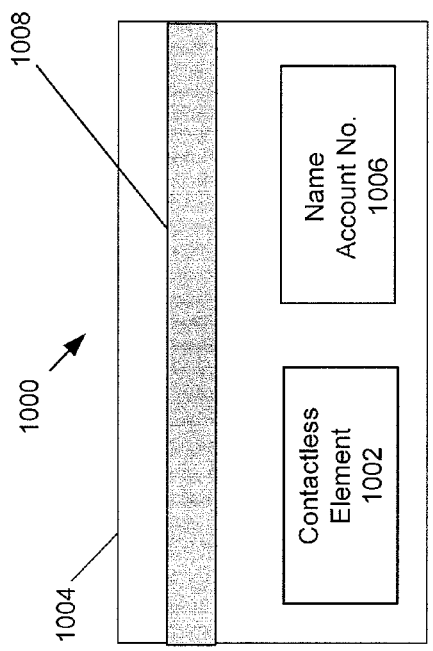
FIG. 10 is a diagram of a portable consumer device that may be used to initiate a transaction, according to an embodiment of the invention.

FIG. 10 is a diagram of a portable consumer device 1000 in the form of a card that includes a contactless payment element 1002, and that may be used to initiate a transaction, in accordance with some embodiments of the present invention. The payment device depicted in FIG. 10 may be a "smart card" or similar device, such as a credit or debit type card in which a chip is embedded. One form of such a device is known as an EMV (Europay™, MasterCard™ and Visa™) card. In the context of the present invention, EMV refers to a standard for interoperation of IC cards ("chip cards") and IC card capable POS terminals and ATMs, and is used for authenticating credit and debit card payments. The EMV standard defines the interactions at the physical, electrical, data and application levels between IC cards and IC card processing devices for use in financial transactions.

FIG. 10 shows a substrate 1004 that provides the form factor for device 1000. A contactless element 1002 for interfacing with a data access or data transfer device may be present on, or embedded within, substrate 1004. Contactless element 1002 may include a chip or other form of data storage element. Contactless element 1002 may include the capability to communicate and transfer data using a near field communications (NFC) technology or other short range communications technology. Consumer information 1006 such as an account number, expiration date, and consumer name may be printed or embossed on the card. Although not necessary for operation as a contactless payment device, device 1000 may include a magnetic stripe 1008 on substrate 1004, where magnetic stripe 1008 permits access to contactless element 1002. This may be used to provide access to data stored in, or the functions of, the chip that is part of the contactless element by a terminal using a magnetic stripe reader.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for generating an alert, the method comprising:

receiving by a transaction processing server computer an authorization request message associated with a first transaction, wherein the transaction processing server computer is configured to receive authorization request messages from a first payment network and a second payment network;

determining whether the authorization request message was routed through the first payment network or the second payment network, wherein the authorization request message is routed through either the first payment network or the second payment network;

in response to determining that the authorization request message was routed through the second payment network, transmitting alert initiation data from the transaction processing server computer to an alert platform associated with the first payment network but not associated with the second payment network; and in response to determining that the authorization request message was routed through the first payment network, transmitting alert initiation data from the first payment processing network to the alert platform;

wherein the alert platform is configured to:
apply at least one alert criterion to the alert initiation data to determine if an alert is to be generated;
generate the alert; and
transmit the alert to a mobile application executed by a processor of a mobile device, the mobile device being associated with a first payment account and a second payment account, and the authorization request message being associated with the first payment account or the second payment account.

2. The method of claim 1, further comprising:
parsing the authorization request message;
analyzing a portion of the authorization request message to determine an identification sequence; and
determining whether an alert service is associated with the identification sequence; wherein if an alert service is not associated with the identification sequence, alert initiation data is not transmitted to the alert platform.

3. The method of claim 1, wherein determining if the authorization request message was routed through the first payment network or the second payment network comprises parsing the authorization request message and analyzing a portion of the authorization request message.

4. The method of claim 1, wherein a plurality of alert criteria is applied to the alert initiation data.

5. The method of claim 4, wherein if multiple alerts are generated from the alert initiation data, a single alert is transmitted to the mobile application.

6. The method of claim 1, wherein if the authorization request message is associated with the first payment account, alert initiation data associated with the first payment account is transmitted to the alert platform, wherein if the authorization request message is associated with the second payment account, alert initiation data associated with the second payment account is transmitted to the alert platform.

7. A server computer comprising:
a processor; and
a non-transitory computer readable medium coupled to the processor, the computer readable medium comprising code executable by a processor for implementing a method comprising:
receiving, by the server computer, an authorization request message associated with a first transaction, wherein the server computer is configured to receive authorization request messages froth a first payment network and a second payment network;
determining whether the authorization request message was routed through the first payment network or the second payment network, wherein the authorization request message is routed through either the first payment network or the second payment network;
in response to determining that the authorization request message was routed through the second payment network, transmitting alert initiation data from the server computer to an alert platform associated with the first payment network but not associated with the second payment network; and
in response to determining that the authorization request message was routed through the first payment network, transmitting alert initiation data from the first payment processing network to the alert platform;
wherein the alert platform is configured to:
apply at least one alert criterion to the alert initiation data to determine if an alert is to be generated;
generate the alert; and
transmit the alert to a mobile application executed of a mobile device, the mobile device being associated with a first payment account and a second payment account, and the authorization request message being associated with the first payment account or the second payment account.

8. The server computer of claim 7, wherein the processor is further configured to:
parse the authorization request message;
analyze a portion of the authorization request message to determine an identification sequence; and
determine whether an alert service is associated with the identification sequence; wherein if an alert service is not associated with the identification sequence, alert initiation data is not transmitted to the alert platform.

9. The server computer of claim 7, wherein determining if the authorization request message was routed through the first payment network of the second payment network comprises parsing the authorization request message and analyzing a portion of the authorization request message.

10. The server computer of claim 7, wherein a plurality of alert criteria is applied to the alert initiation data.

11. The server computer of claim 10, wherein if multiple alerts are generated from the alert initiation data, a single alert is transmitted to the mobile application.

12. The server computer of claim 7, wherein if the authorization request message is associated with the first payment account, alert initiation data associated with the first payment account is transmitted to the alert platform, wherein if the authorization request message is associated with the second payment account, alert initiation data associated with the second payment account is transmitted to the alert platform.

13. A method for generating an alert, the method comprising:
generating, by a computer, an authorization request message associated with a first transaction;
transmitting the authorization request message via one of a first payment processing network or a second payment processing network to a transaction processing server computer;
wherein the transaction processing server computer is configured to:
determine whether the authorization request message was routed through the first payment network or the second payment network; wherein the authorization request message is routed through either one of the first payment network or the second payment network;
in response to determining that the authorization request message was routed through the second payment network, transmitting alert initiation data from the transaction processing server computer to an alert platform associated with the first payment network but not associated with the second payment network; and
in response to determining that the authorization request message was routed through the first payment network, transmitting alert initiation data from the first payment processing network to the alert platform;
wherein the alert platform is configured to:
apply at least one alert criterion to the alert initiation data to determine if an alert is to be generated;

generate the alert; and transmit the alert to a mobile application executed by a processor of a mobile device, the mobile device being associated with a first payment account and a second payment account, and the authorization request message being associated with the first payment account or the second payment account.

14. The method of claim 13, wherein if the authorization request message is associated with the first payment account, alert initiation data associated with the first payment account is transmitted to the alert platform, wherein if the authorization request message is associated with the second payment account, alert initiation data associated with the second payment account is transmitted to the alert platform.

15. A computer comprising:

a processor; and a non-transitory computer readable medium coupled to the processor, the computer readable medium comprising code executable by a processor for implementing a method comprising:

generating an authorization request message associated with a first transaction;

transmitting the authorization request message via one of a first payment processing network or a second payment processing network to a transaction processing server computer;

wherein the transaction processing server computer is configured to:

determine whether the authorization request message was routed through the first payment network or the second payment network, wherein the authorization request message is routed through either the first payment network or the second payment network;

in response to determining that the authorization request message was routed through the second payment network, transmitting alert initiation data from the transaction processing server computer to an alert platform associated with the first payment network; and in response to determining that the authorization request message was routed through the first payment network, transmitting alert initiation data from the first payment processing network to the alert platform;

wherein the alert platform is configured to:

apply at least one alert criterion to the alert initiation data to determine if an alert is to be generated;

generate the alert; and transmit the alert to a mobile application executed by a processor of a mobile device, the mobile device being associated with a first payment account and a second payment account, and the authorization request message being associated with the first payment account or the second payment account.

16. The computer of claim 15, wherein if the authorization request message is associated with the first payment account, alert initiation data associated with the first payment account is transmitted to the alert platform, wherein if the authorization request message is associated with the second payment account, alert initiation data associated with the second payment account is transmitted to the alert platform.

* * * * *